Nov. 27, 1928.

M. J. ANDERSON 1,693,014

CONVEYING APPARATUS

Filed July 29, 1927    4 Sheets-Sheet 1

INVENTOR
MARTIN J. ANDERSON
BY Paul, Paul Moore
ATTORNEYS

Patented Nov. 27, 1928.

1,693,014

UNITED STATES PATENT OFFICE.

MARTIN J. ANDERSON, OF ELLWOOD CITY, PENNSYLVANIA, ASSIGNOR TO MATHEWS CONVEYER COMPANY, OF ELLWOOD CITY, PENNSYLVANIA, A CORPORATION OF PENNSYLVANIA.

CONVEYING APPARATUS.

Application filed July 29, 1927. Serial No. 209,312.

This invention relates to new and useful improvements in conveying apparatus, generally, and more particularly relates to such an apparatus comprising a main belt conveyer having a plurality of branch conveyers leading therefrom.

An object of the invention is to provide a conveying apparatus comprising a main conveyer including a conveyer belt and having a plurality of branch conveyers leading therefrom, and a tray or carrier being adapted to travel over the conveyer system and having means thereon for actuating a mechanism arranged over the main conveyer, whereby the carrier may be diverted to a selected branch conveyer.

A further object is to provide such a conveying apparatus having a plurality of conveyer rollers interposed in the main conveyer at the junction of each branch conveyer, and an auxiliary belt being arranged beneath said rollers and peripherally engaged therewith, said auxiliary belt being frictionally engaged with the main conveyer belt to provide a drive therefor.

A further object of the invention is to provide a conveying apparatus having means arranged thereover for diverting packages or carriers from the main conveyer onto a selected branch conveyer, and a plurality of metallic rollers being interposed in the main conveyer at the junction of each branch conveyer, whereby the usual wear and tear, caused by diverting articles from the main conveyer onto the branch conveyer, will be taken up by the said rollers and not by the main belt, thereby greatly prolonging the life of the main conveyer belt and also reducing the amount of wear upon the carriers or boxes in which the articles are conveyed.

A further object is to provide a conveying apparatus comprising a main conveyer and a plurality of branch conveyers having means for minimizing wear on the main conveyer belt at the junction of each branch conveyer, caused by boxes or articles being diverted from the main conveyer, and, whereby the articles or packages may be diverted from the main conveyer onto a selected branch conveyer without any appreciable vibration or jarring.

A further object is to provide an improved conveying apparatus particularly adapted for use in the handling of polished and delicately finished articles, which is so constructed and arranged that the articles may be diverted from the main conveyer onto a branch conveyer without vibration of jar, thereby preventing the finish on the articles from becoming marred or damaged, while being conveyed over the system to a predetermined destination.

Features of the invention reside in the general construction and arrangement of the main conveyer and branch conveyers; in the provision of the live conveyer rollers at the junction of each branch conveyer; in the particular manner in which the conveyer rollers are driven and in the manner in which they are supported, which is such as to cause the rollers to be pressed against the auxiliary drive belt, when the load travels thereover, thus increasing the frictional contact of the rollers with the auxiliary drive belt; in the means provided upon the carriers or trays which co-operates with the stationary means arranged over the main conveyer for selectively diverting the articles onto a branch conveyer; and, in the constructional details and simplicity of the entire conveying apparatus.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the accompanying drawings forming part of this specification;

Figure 6 is a perspective view showing one of the boxes or carriers used for conveying the articles over the conveyer system; and Figure 7 is a perspective view showing one of the pins provided at each end of the carriers for controlling the diversion of the carrier to a selected branch conveyer.

Figure 1:
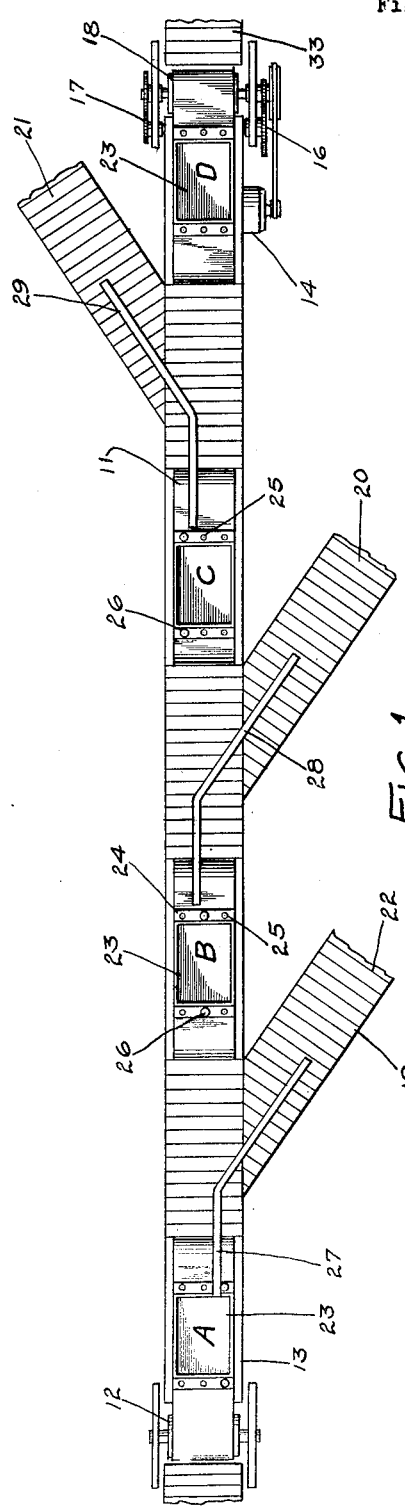
Figure 1 is a diagrammatic plan view showing a main conveyer having a plurality of branch conveyers leading therefrom.

The novel conveying apparatus featured in this invention comprises a main conveyer belt 11 mounted upon suitable pulleys 12 supported upon a structural frame 13. A motor 14 is provided at one end of the main conveyer and has a belt drive 15 with a pair of gears 16 which are operatively connected with a pair of similar gears 17, provided at the opposite side of the conveyer; the gears 17 are operatively connected with the drive roller 18 over which the main conveyer belt 11 passes, as shown in Figures 1 and 2.

A plurality of branch conveyers 19, 20, and 21 are connected with the main conveyer and lead therefrom to predetermined destinations or bins, each branch conveyer 19 preferably comprises a plurality of anti-friction rollers 22, and the conveyers are preferably arranged at a slight incline, whereby the carriers or articles, after being delivered onto a branch conveyer, will travel by gravity thereover.

Figure 4:
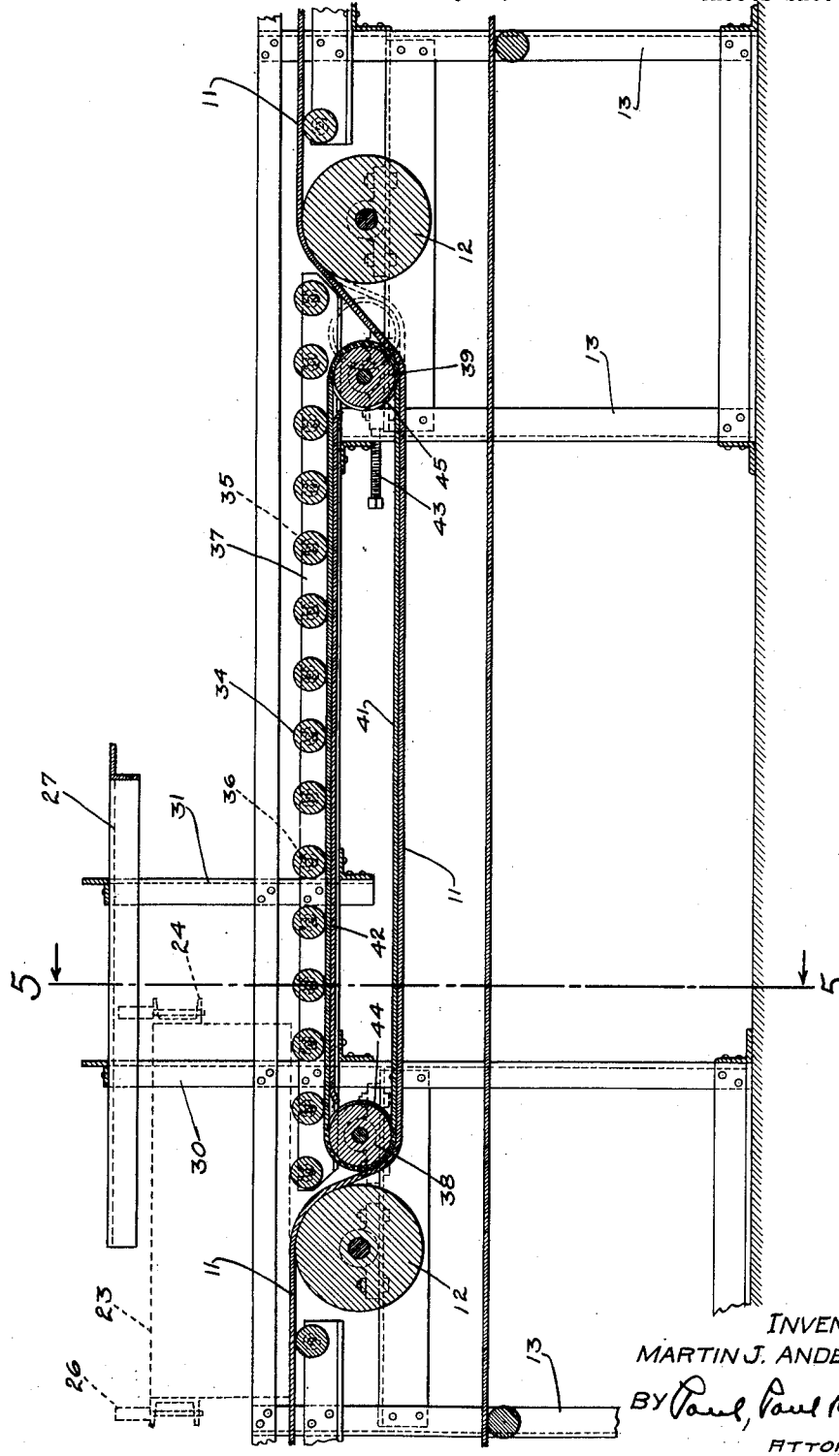
Figure 4 is a longitudinal sectional view on the line 4—4 of Figure 3 showing the auxiliary drive belt for the conveyer rollers and its frictional engagement with the main conveyer belt.
Figure 5:
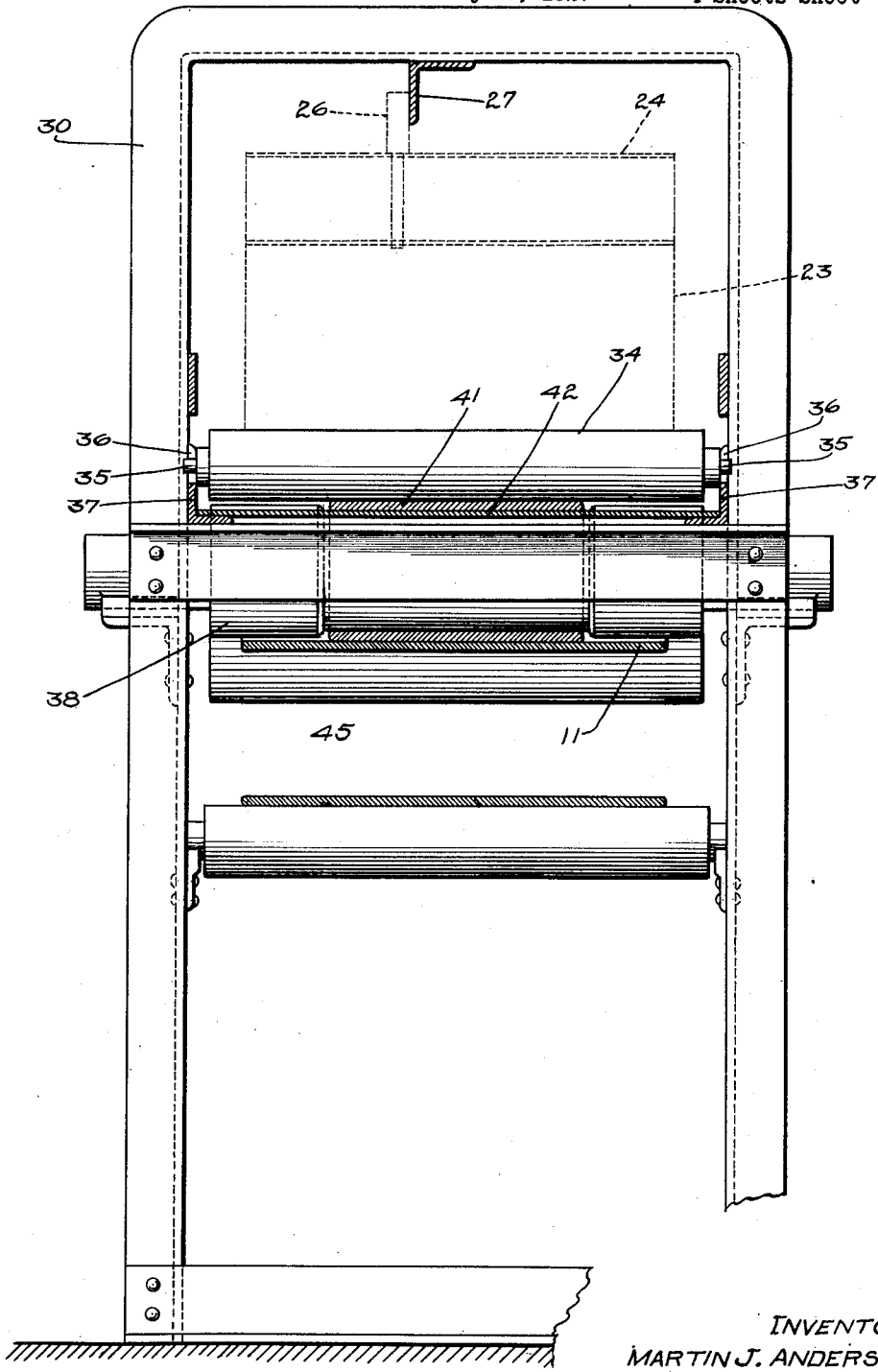
Figure 5 is an enlarged cross sectional view on the line 5—5 of Figure 4.

In the form of apparatus here shown, a box carrier 23 is preferably employed for supporting and carrying the articles over the conveyer system. These carriers are constructed in the form of a box, and have a suitable reinforcing member, such as a channel iron 24, transversely arranged at each end thereof at the upper corners of the box. Each reinforcing member has provided therein a plurality of spaced apertures 25, adapted to receive a control pin 26, shown in Figures 6 and 7. These control pins are adapted to selectively engage rails 27, 28, and 29, which rails are respectively arranged over the junctions of the branch lines 19, 20, and 21 with the main conveyer. In the drawings, three apertures are provided in each reinforcing member 24 of the carrier. To be exact, six apertures are provided in each reinforcing member, three in the upper web thereof and three in the lower web, the reduced extension of the control pin being made long enough to extend through the alined apertures in said webs. It will also be noted by reference to Figure 1, that the rails 27, 28, and 29 arranged over the main conveyer, are not alined with one another but are offset with respect to one another and with respect to the longitudinal center line of the main carrier. The particular location of the portion of each rail which is alined with the main conveyer, corresponds to the location of the apertures provided in the carriers in which the control pins 26 are mounted. The rails 27, 28, and 29 are suitably supported upon frame structures 30, 31, and 32, shown in Figures 2, 4, and 5.

Figure 2:
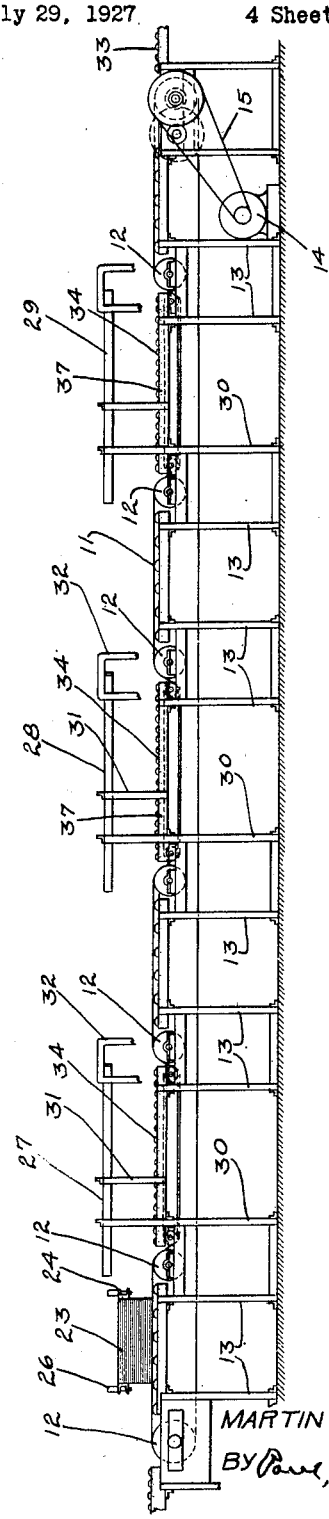
Figure 2 is a side elevation of Figure 1.
Figure 3:
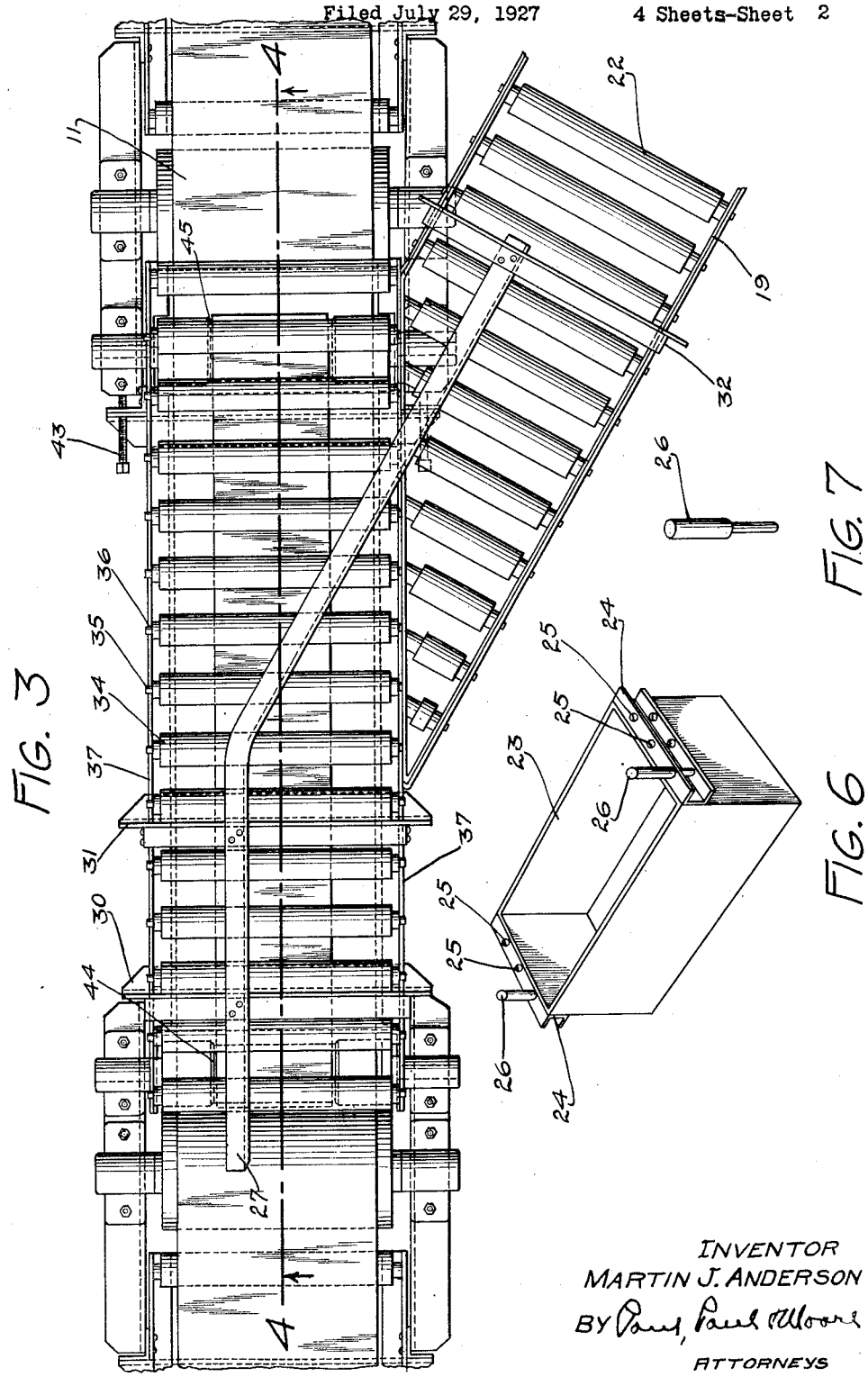
Figure 3 is an enlarged detailed plan view showing the connection between one of the branch conveyers and the main conveyer.

In Figure 1, it will be noted that four carriers are shown, marked A, B, C, and D. On the A carrier, the control pins 26 are inserted in the holes or apertures located at the right hand side of the carrier, looking at it in the direction of travel, thereby causing these control pins to engage the rail 27, with the result that the A carrier will be diverted onto the branch conveyer 19. When it is desired to divert a carrier onto the branch conveyer 20, the control pins 26 will be inserted in the center holes in the tray, as shown on the B tray, thereby causing the control pins upon this particular carrier to engage the rail 28 with the result that it will be diverted onto the branch conveyer 20. Likewise, when it is desired to divert a carrier onto the branch line 21, the control pins will be inserted in the holes at the left hand side of the carrier, as shown on carrier C, thereby causing these pins to similarly engage the rail 29, with the result that the tray will be diverted onto the branch line 21. When no control pins are inserted in the apertures provided in the reinforcing members at each end of the carriers, then the carrier will continue onwardly over the main conveyer and onto the conveyer section 33, shown at the right hand side of Figure 1. The purpose of providing a control pin at each end of the carriers is to cause the carriers to be diverted from the main conveyer onto a selected branch conveyer with the least amount of vibration and shock. This is accomplished by positively guiding each end of each tray from the main conveyer onto a selected branch conveyer. In operation, first one end of the tray will be diverted or guided from the main conveyer onto a selected branch conveyer, as a result of the leading control pin engaging a given diverting rail, after which the tail end of the tray will similarly be guided from the main conveyer by the following control pin engaging the same rail, thereby causing the tray to be accurately guided from the main conveyer onto the selected branch conveyer, substantially without shock or vibration.

An important feature of this invention resides in the means provided at the junction of each branch conveyer for eliminating wear from the main conveyer belt, and, also whereby the carriers are more easily diverted from the main conveyer onto a selected branch conveyer. Such means consists of interposing in the main conveyer at each branch line junction, a plurality of conveyer rollers 34 having their upper portions alined with the upper surface of the main conveyer belt, as particularly shown in Figure 4. Each conveyer roller 34 is provided at its ends with reduced end portions 35, guidingly received in vertical slots 36, provided in the side frame members 37 of the main conveyer frame. It will also be noted, by reference to Figure 4, that the main conveyer belt 11 passes beneath the conveyer rollers 34, and is guided therebeneath by means of a pair of rollers 38 and 39. An auxiliary drive belt 41 is mounted upon the rollers 38 and 39 and is frictionally engaged with the depressed portion of the main conveyer belt 11. (See Figure 4.) A plurality of the conveyer rollers 34 are peripherally engaged with the auxiliary drive belt 41, at their lower portions, so that they actually ride upon the auxiliary belt 41 when the latter is rotated by its frictional engagement with the main conveyer belt 11. A supporting plate 42 is arranged beneath the upper section of the auxiliary belt 41 and extends practically from the roller 38 to the roller 39, thus providing a support for the upper section of the auxiliary belt 41, when the rollers 34 are pressed downwardly as a result of a carrier passing thereover. The roller 39 is adjustable by means of an adjusting screw 43, whereby the auxiliary belt 41 may be kept taut. The auxiliary belt 41 is preferably narrower than the main conveyer belt 11, and the rollers 38 and 39, are preferably provided with peripheral recesses 44 and 45, respectively, adapted to receive the belt. By thus mounting the auxiliary belt 41, it will be guided in its travel and will be retained in longitudinal alinement with the main conveyer belt 11. If desired, other means may be provided for guiding the auxiliary belt such, for instance, as a pair of guide rollers, one arranged at each side thereof.

By thus providing a plurality of live conveyer rollers in the main conveyer at the junction of each branch conveyer, the carriers or packages may readily be diverted from the main conveyer onto a selected branch conveyer with a minimum amount of resistance, as the co-efficient of friction between the carriers and the rollers, when diverting the carrier from the main conveyer, is considerably less than it would be between the carrier and the main belt. Also, by the use of the live conveyer rollers at each branch line junction, the usual wear and tear, caused by diverting articles or carriers from the main conveyer onto a branch conveyer, is transmitted to the conveyer rollers and not to the main conveyer belt, thereby greatly prolonging the life of the main belt and also eliminating unnecessary wear and tear on the equipment, as a whole, including the boxes or articles conveyed thereover. It has also been found that by the employment of the conveyer rollers at the branch line junctions, that the carriers or packages may be diverted from the main conveyer onto a selected branch conveyer with considerably less jar and vibration, and also with less friction, thereby providing such a conveying apparatus, particularly well adapted for use in the handling of polished silver or nickel-plated articles, which can thus be handled without danger of becoming marred or damaged.

Also, by the employment of two control pins, one at each end of each carrier, the diverting of a carrier from the main conveyer onto a selected branch conveyer, is accomplished by considerably less jar and vibration and this, in connection with the anti-friction conveyer rollers provided at each junction, provides a structure particularly well adapted for use in diverting articles from one conveyer onto another with a minimum amount of vibration and jar.

In the drawings, I have shown the rails 27, 28, and 29, provided over the main conveyer for diverting the carriers therefrom onto a selected branch conveyer, as being rigidly mounted. These, however, may be mounted in any suitable manner desired to meet the requirements of a given installation. The use of the live rollers 34 and the particular way in which they are driven may, however, be used in connection with other types of diverting mechanisms, without departing from the scope of the invention. By driving the conveyer rollers 34, as above described, the latter will rotate freely or run on the auxiliary belt 41, when no load is passing thereover, and, when a load passes over the rollers 34, they will be pressed or forced downwardly against the belt 41, which in turn is supported upon the plate 42 thereby causing the frictional engagement of the rollers with the surface of the auxiliary belt 41 to cause the rollers to be rotated in a direction to cause the carrier or packages to continue onward in the direction of travel of the main conveyer belt.

I claim as my invention:

1. In a conveying apparatus, the combination with a conveyer including a main conveyer belt, of a plurality of conveyer rollers interposed in said conveyer, and an auxiliary belt frictionally engaged with said main belt and adapted to rotate said rollers.

2. In a conveying apparatus, the combination with a conveyer including a main conveyer belt, of a plurality of conveyer rollers interposed in said main conveyer and arranged transversely thereof and having the upper portions of their peripheries alined with the surface of said belt, and an auxiliary belt frictionally engaged with said main belt and peripherally engaged with said rollers to rotate the latter.

3. In a conveying apparatus, the combination with a conveyer including a main conveyer belt having a portion thereof depressed below the normal plane of the belt, of a plurality of conveyer rollers mounted in said main belt depression and transversely arranged with respect to said belt and having the upper portions of their peripheries substantially alined with the upper surfaces of said main belt, and an auxiliary belt arranged within the depressed portion of said main belt and frictionally engaged therewith and peripherally engaged with the lower portions of said rollers whereby, when said main belt is operated, said auxiliary belt will be rotated to drive said rollers.

4. In a conveying apparatus, the combination with a conveyer including a main conveyer belt and a branch conveyer, of a plurality of conveyer rollers interposed in said main conveyer, and an auxiliary belt frictionally engaged with said main belt and adapted to rotate said rollers.

5. In a conveying apparatus, the combination with a conveyer including a main conveyer belt and a branch conveyer, of a plurality of conveyer rollers interposed in said main conveyer at the junction of said branch conveyer, and an auxiliary belt frictionally engaged with said main belt and peripherally engaged with said rollers to rotate the latter.

6. In a conveying apparatus, the combination of a main conveyer including a conveyer belt and a branch conveyer, a plurality of rollers interposed in said main conveyer at the junction of said branch conveyer, and an auxiliary belt frictionally engaged with said main belt and having a driving connection with said conveyer rollers to cause articles delivered thereto to be conveyed in the direction of travel of the main conveyer belt.

7. In a conveying apparatus, the combination of a main conveyer including a conveyer belt and a branch conveyer, a plurality of rollers interposed in said main conveyer at the junction of said branch conveyer, an auxiliary belt frictionally engaged with said main belt and having a driving connection with said conveyer rollers to cause articles delivered thereto to be conveyed in the direction of travel of the main conveyer belt, and means for diverting articles from the main conveyer onto said branch conveyer.

8. In a conveying apparatus, the combination of a main conveyer including a conveyer belt and a branch conveyer, a section of said main conveyer belt being depressed at the junction of said branch conveyer, a plurality of conveyer rollers arranged over the depressed section in said main belt, means for supporting said rollers, and an auxiliary belt mounted between said rollers and the depressed section in said main belt and being peripherally engaged with the lower portions of said conveyer rollers and frictionally engaged with the depressed section of said main belt, whereby said auxiliary belt will be rotated to transmit rotary movement to said conveyer rollers.

9. In a conveying apparatus, the combination of a main conveyer including a conveyer belt and a branch conveyer, a section of said main conveyer belt being depressed at the junction of said branch conveyer, a plurality of conveyer rollers arranged over said depressed section and adapted for limited vertical movement, and an auxiliary belt mounted within said main belt depression and having its upper run peripherally engaging the lower portions of said conveyer rollers and having its lower run frictionally engaging the depressed section of said main conveyer belt, whereby said auxiliary belt will be rotated to transmit rotary movement to said conveyer rollers.

10. In a conveying apparatus, the combination of a main conveyer belt having a portion thereof depressed, an auxiliary belt having a frictional driving connection with said main belt within said depression, a plurality of conveyer rollers mounted over said auxiliary belt and peripherally engaged with the upper run thereof, the upper portions of said rollers being alined with the upper surface of said main conveyer belt to provide substantially a continuation thereof, and means for supporting the upper run of said auxiliary belt when a load is passing over said rollers.

11. In a conveying apparatus, the combination of a main conveyer belt having a portion thereof depressed, an auxiliary belt having a frictional driving connection with said main belt within said depression, a plurality of conveyer rollers being mounted over said auxiliary belt and the lower portions of said rollers being peripherally engaged with the upper run of said belt and the upper portions of said rollers being alined with the upper surface of said main conveyer belt to provide a continuation thereof, a support for said rollers permitting vertical movement therein, and a supporting plate being arranged beneath the upper run of said auxiliary belt to support the latter when a load is passing over said conveyer rollers, said plate limiting downward movement of said belt and rollers.

12. In a conveying apparatus, the combination of a main conveyer including a conveyer belt and a plurality of branch conveyers, of a carrier adapted to travel over said conveyers, control means provided on said carrier selectively cooperable with means over said main conveyer for diverting said carrier onto a selected branch conveyer, and a plurality of rollers in said main conveyer at the junction of each branch conveyer, having a driving connection with said main conveyer belt, said rollers constituting a portion of said main conveyer.

13. In a conveying apparatus, the combination of a main conveyer including a conveyer belt and a plurality of branch conveyers, of a carrier adapted to travel over said conveyers, a control pin at each end of said carrier adapted to engage means over said main conveyer for diverting said carrier onto a selected branch conveyer, and a plurality of rollers interposed in said main conveyer at the junction of each branch conveyer, an auxiliary belt frictionally engaged with said conveyer belt and driven thereby, means for supporting said auxiliary belt, and said auxiliary belt peripherally engaging said rollers whereby the latter are rotated when said main conveyer belt is operated.

14. In a conveying apparatus, the combination of a main conveyer including a belt and a plurality of branch conveyers, a carrier adapted to travel over said conveyers, a control pin provided at each end of the carrier, stationary means mounted over said main conveyer at the junction of each branch conveyer adapted to be engaged by the control pins of a given carrier to cause the diversion of the latter onto a selected branch conveyer, a plurality of conveyer rollers interposed in the main conveyer at the junction of each branch conveyer, an auxiliary belt arranged beneath said conveyer rollers and peripherally engaged therewith and a section of said main belt passing beneath said auxiliary belt and frictionally engaged therewith, whereby the latter is operated to transmit rotary movement to said conveyer rollers.

15. In a conveying apparatus, the combination of a main conveyer including a belt and a plurality of branch conveyers, a carrier adapted to travel over said conveyers, a control pin provided at each end of the carrier, stationary inclined rails mounted over said main conveyer at the junction of each branch conveyer adapted to be engaged by the control pins of a given carrier to cause the diversion of the latter onto a selected branch conveyer, a plurality of conveyer rollers interposed in the main conveyer at the junction of each branch conveyer, and having their upper portions alined with the upper surface of said conveyer belt, an auxiliary belt arranged beneath said conveyer rollers and peripherally engaged therewith, and a section of said main belt passing beneath said auxiliary belt and said rollers and frictionally engaged with said auxiliary belt, whereby the latter is operated to transmit rotary movement to said conveyer rollers in a direction to cause carriers or articles delivered thereto to continue onward in the direction of travel of said main conveyer belt.

16. In a conveying apparatus, the combination of a conveyer belt and a plurality of branch conveyers, a supporting frame therefor, a section of said belt being depressed below the normal level of the belt, an auxiliary belt mounted within the depression in said main conveyer belt depression and frictionally engaged therewith, a plurality of rollers supported upon the upper run of said auxiliary belt and having their upper portions substantially alined with the normal level of the conveyer belt, slotted guide rails for retaining said rollers in spaced relation and whereby said rollers are adapted for vertical movement, and a supporting plate beneath the upper run of said auxiliary belt for limiting the downward movement of said rollers, when a load passes thereover.

17. In a conveying apparatus, the combination with a main conveyer belt having branch conveyers leading therefrom, a section of said main belt being depressed below the normal level thereof at each branch junction, an auxiliary belt, of narrower width, mounted within the depression in said main belt and frictionally engaged therewith whereby, when said main belt is operated, the upper run of said auxiliary belt will travel in a direction opposite to that of the main belt, a plurality of conveyer rollers supported upon the upper run of said auxiliary belt and having their upper portions substantially alined with the normal level of the main belt surface, a rail provided at each side of said main belt adjacent to said depression, said rails having a plurality of spaced vertical slots therein adapted to receive the terminals of said rollers to provide guides and spacers therefor, a supporting plate provided beneath the upper run of said auxiliary belt to provide a support therefor when a load passes over said rollers, and means arranged over said main conveyer belt at each branch line junction adapted to divert an article from the main conveyer belt onto a selected branch conveyer.

18. A conveyer comprising a frame including a pair of side rails, a plurality of spaced slots in the upper portions of said rails open at their upper ends, a plurality of rollers each having reduced end portions adapted to be received in said slots, said slots permitting vertical movement of the rollers, when a load passes thereover, a drive belt arranged beneath said rollers and having its upper run peripherally engaged therewith and adapted to carry the weight of the rollers, when unloaded, means for operating said belt, and a supporting plate arranged directly beneath the upper run of the belt and adapted to be engaged thereby to provide a support for and below the rollers, when the latter are depressed by the passage of a load thereover.

19. A conveying apparatus comprising a main conveyer belt, a depressed section in a run of said belt, a plurality of rollers mounted in said depressed section and having their upper portions aligned substantially with the surface of said conveyer belt to form a continuation of the conveyer, and a driving connection between said belt and rollers.

20. A conveying apparatus comprising a main conveyer belt, a depressed section in a run of said belt, a plurality of rollers mounted in said depressed section and arranged transversely of said belt, vertical guides for said rollers, and means operatively connecting said rollers with said belt, when a load passes thereover.

21. A conveying apparatus comprising a main conveyer belt, a branch conveyer connected therewith, a depressed section in a run of said main conveyer belt located at the junction between said conveyers, a plurality of rollers mounted in said depressed section and adapted for vertical movement, a driving connection between said rollers and said main conveyer belt, and means for diverting articles from said main conveyer onto said branch conveyer, said rollers functioning to relieve said main conveyer belt of unnecessary wear, caused by articles being diverted therefrom.

In witness whereof, I have hereunto set my hand this 25 day of July, 1927.

MARTIN J. ANDERSON.